United States Patent Office 3,463,742
Patented Aug. 26, 1969

3,463,742
PARTIALLY HYDRATED TITANIUM DIOXIDE CATALYST FOR POLYESTER PREPARATION
Alan Bell and Thomas Howard Strickland, Kingsport, Tenn., assignors to Eastman Kodak Company, Rochester, N.Y., a corporation of New Jersey
No Drawing. Continuation-in-part of application Ser. No. 441,857, Mar. 22, 1965. This application Sept. 5, 1967, Ser. No. 665,282
Int. Cl. B01j 11/06; C07c 69/76
U.S. Cl. 252—430          5 Claims

ABSTRACT OF THE DISCLOSURE

Substantially colorless, highly polymeric condensation polyesters are prepared from a lower dialkyl ester of a bifunctional dicarboxylic acid and a bifunctional glycol by using a catalyst composition comprising a substantially amorphous, partially hydrated titanium dioxide dispersed in a liquid carrier compound.

---

This application is a continuation-in-part of Bell and Strickland U.S. Ser. No. 441,857, filed Mar. 22, 1965, now abandoned which in turn is a continuation-in-part of Bell and Strickland U.S. Ser. No. 170,485, filed Feb. 1, 1962, now abandoned.

This invention relates to an unusually effective catalyst useful in preparing fiber- and the film-forming linear condensation type polyesters of bifunctional dicarboxylic acids and bifunctional glycols, e.g., poly(ethylene terephthalate). This catalyst is freshly precipitated titanium hydroxide which is advantageously prepared by the process described below. The catalyst composition may also be defined as an anhydrous slurry of partially hydrated titanium dioxide dispersed in a liquid carrier compound. The catalyst is effective during the ester interchange reaction producing essentially monomeric esters of the acid and glycol and is also unexpectedly highly effective during the subsequent polymerization.

The prior art to which this invention relates contains a great number of disclosures relating to various methods for preparing fiber- and film-forming condensation type polyesters. A great number of polyesterification catalysts have been disclosed along with various techniques for conducting the polyesterification using such catalysts. One of the most basic patents relating to this field is U.S. 2,465,319. A great number of other patents describe various catalysts and various processes which can be employed, for example, U.S. 2,720,502; U.S. 2,901,466; etc. The use of a titanium catalyst is not new in the art, but the particular catalyst employed in this application for the process defined herein is novel and quite unobviously highly effective, especially with regard to the efficacious production of polyesters having substantially no color. The state of the art with respect to simple esterification processes using colloidal or other types of dispersions of titanium dioxide, titanium hydroxide, or other forms thereof is set forth in Danish Patent 44,122. The use of such compounds which have not been prepared in the manner described in this application is also set forth in British Patent 849,109 and U.S. Patent 3,056,817.

The latter patent gives a typical description of hydrated titanium dioxide gels (preferably 60–95 percent hydrated) and discloses their use as esterification catalysts. It is indicated that when the degree of hydration falls much below 24 percent, then utility as a catalyst is seriously impaired.

In contrast to the prior art, the applicants have unexpectedly discovered that ester exchange reactions can be quite advantageously promoted by employing as a catalyst an anhydrous slurry of partially hydrated titanium dioxide dispersed in a certain type of preferred liquid carrier wherein the degree of hydration is from about 2 percent to about 14 percent. This discovery and the advantages associated with it were quite unexpected.

Moreover, the present invention is especially useful in polyesterification reactions and particularly those where the final polymerization is done under solid phase conditions as illustrated by Examples 4–7 hereinbelow.

One of the most crucial problems in selecting a catalyst for use in preparing polyesters is the avoidance of color and cloudiness in the polyester produced. This is especially crucial in the case of those polyesters to be used to form a support or film base for photographic emulsions (either color or black-and-white) where the optical requirements are such that a substantially colorless and clear polyester is of great importance. Those titanium catalysts which have been disclosed in the prior art are generally characterized by efficacious activity except for the fact that the color of the product is not considered to be adequate for the preparation of polyesters to be used as photographic film base or for other purposes where substantially no color is desired.

It is an object of this invention to provide a novel polyesterification process using freshly precipitated titanium hydroxide (also called hydrated titanium dioxide, 2–14 percent hydration) so as to produce linear polyesters having substantially no color. It is an additional object of this invention to provide a process for producing the freshly precipitated titanium hydroxide catalyst to be used in conjunction with the polyesterification process.

It is a further object of this invention to provide a process for producing substantially colorless linear polyesters. Other objects will become apparent elsewhere herein.

There is no reason in this specification to indulge in an extensive elaboration of the various processes which can be employed in preparing polyesters. Those U.S. patents mentioned above as well as many other patents and papers in the literature describe such processes in great detail. A common feature of all of the processes with this invention is concerned is that they begin with a lower dialykyl ester of a bifunctional dicarboxylic acid which is condensed with a bifunctional glycol.

Although the polyesterification process can be thought of as taking place in two stages, the process which is sometimes referred to as the melt polyesterification process does not necessarily need to be conducted with any particular interruption between the two stages. When the polyesterification is being conducted using apparatus designed to provide a continuous process, it is sometimes advantageous to divide the process into a number of separate stages conducted in a number of separate pieces of apparatus. However, the process can still be considered to be essentially an initial ester interchange reaction followed up by a final polyesterification reaction, which can, if desired, be interrupted so as to employ the melt polyesterification technique for part of the polyesterification and a solid phase technique for the remainder of the polyesterification. When the solid phase technique is employed, it can be performed either under a vacuum or under atmospheric pressure using an inert gas. Of course, intermediate reduced pressures can be employed as well as pressures above atmospheric.

A preferred embodiment of this invention provides an improvement in a process for preparing a highly polymeric condensation-type linear polyester by condensing a lower dialkyl ester of a bifunctional dicarboxylic acid with a bifunctional glycol wherein the alkyl radicals contain from 1 to 4 carbon atoms, the dicarboxylic acid is predominantly composed of an aromatic acid containing from 1 to 2 benzene rings and from 8 to 20 carbon atoms and the glycol contains from 2 to 10 carbon atoms, by first preparing at an elevated temperature in the presence of a catalyst a substantially monomeric intermediate polymer (also designated as a "prepolymer") under conditions facilitating removal of the lower alkanol formed from said lower dialkyl ester by ester interchange with said glycol and then polymerizing at an elevated temperature said intermediate polymer in the presence of a catalyst under conditions facilitating removal of superfluous quantities of said glycol. This preferred embodiment of the invention consists in having said catalyst present in a concentration of from 0.001 percent to 0.1 percent based on the weight of said lower dialkyl ester, said catalyst being essentially composed of freshly precipitated titanium hydroxide which has been precipitated from an aqueous solution of a titanium halide with ammonium hydroxide, filtered, dispersed in an alkanol of 4 to 8 carbon atoms, and isolated from the residual water by azeotropic distillation whereby said titanium hydroxide remains as a dispersion in said alkanol, said dispersion being used as said catalyst in said process.

The degree of polymerization is proportionate to the inherent viscosity of the polyester. A convenient solvent for measuring the inherent viscosity is a mixture of 60 percent phenol and 40 percent tetrachloroethane, although other solvents such as carbon tetrachloride can be employed. The inherent viscosity for different polyesters does not necessarily represent the same molecular weight. The highly polymeric polyesters contemplated by this invention correspond to an inherent viscosity of at least 0.5 for poly(ethylene terephthalate). Other polyesters having the same molecular weight (12,000–13,000 or higher) may have higher or lower inherent viscosities (such as 0.4) indicative of said minimum molecular weight. As a broad generalization, it is desired that the polyesters especially useful for preparing fibers and films have an inherent viscosity of about 0.55 or higher.

Whenever the term "inherent viscosity" (I.V.) is used in this application, it will be understood to refer to viscosity determinations made at 25° C. using 0.25 gram of polymer in 100 ml. of a solvent composed of 60 percent phenol and 40 percent tetrachloroethane.

This invention will be further illustrated by the following examples of preferred embodiments, although it will be understood that these examples are included merely for purposes of illustration and are not intended to limit the scope of the invention.

EXAMPLE 1.—PREPARATION OF FRESHLY PRECIPITATED TITANIUM HYDROXIDE FOR USE AS CATALYST

Thirty-seven grams of titanium tetrachloride (0.195 mole) was slowly added with vigorous agitation to 400 grams ice water. The temperature was maintained above 20° C. throughout the addition of the titanium tetrachloride. To this clear solution was slowly added 180 grams of 15 percent ammonium hydroxide which had been previously cooled to 0° C. The precipitated titanium hydroxide was collected by filtration and washed free of ammonium chloride by slurrying with distilled water. The excess water was removed from the titanium hydroxide by washing with methanol. The titanium hydroxide was suspended in 150 grams butanol and any remaining methanol removed from the slurry by distillation. Two hundred cubic centimeters of benzene was added to the butanol slurry and the last traces of excess water removed as the benzene azeotrope. When water was no longer observed in the benzene reflux, the benzene was removed by distillation. The resulting slurry in butanol was passed through a 150-mesh (Tyler) screen in order to remove any large particles. The weight of the resulting effluent was adjusted to 180 grams by the addition of butanol so that the slurry contained 5.2 percent titanium (calculated as metal). This slurry may be used directly as the catalyst for polymerization.

This process can also be employed using other titanium halides such as titanium tetrabromide. Moreover, other azeotropic agents can be used such as toluene. Other variations of the process are obvious to those skilled in the art.

A batch of the hydrated titanium dioxide slurry prepared as described in Example 1 was analyzed with Karl Fisher reagent to ascertain the amount of water. After dehydrating a portion at 100° C., it was determined that the hydrate had 3.73 percent water of hydration. Since there was a possibility that not all water had been eliminated, another portion was dehydrated at 650° C. until a constant weight was achieved; this procedure showed that the hydrate contained 4.66 percent water of hydration.

The titanium oxide hydrate was examined by X-ray diffractometry and the diffraction pattern indicated that the material was amorphous, or if a crystalline phase did exist, the particle size was less than 25 angstrom units in mean dimension. Therefore, these titanium compounds may be designated as substantially amorphous. Whenever the term "substantially amorphous" appears in this application, it will be understood to refer to compounds which, when examined by X-ray diffractometry (having a lower measurement limitation of 25 angstrom units in mean dimension), appear to be amorphous.

Other catalyst slurries can be similarly prepared using the process of Example 1 but employing other halides, azeotropic agents, and liquid carriers other than butanol.

Thus, this invention provides a catalytic composition for promoting ester exchange between a relatively high boiling alcohol and an ester of a relatively low boiling alcohol and an organic carboxylic acid, said catalytic composition consisting of an anhydrous slurry of substantially amorphous, partially hydrated titanium dioxide having from 2 to 14 percent by weight of water of hydration and dispersed in a liquid carrier compound which is a saturated alcohol having 1 to 3 hydroxyl groups.

The preferred catalyst composition contains from about 2 to about 20 percent titanium (calculated as the metal).

The relatively high boiling alcohol involved in the ester exchange is advantageously monohydric or dihydric. This alcohol is a glycol when the process is intended to produce a polyester. In such a case, the organic carboxylic acid is a bifunctional carboxylic acid, e.g., a dicarboxylic acid. Of course, other ester exchange reactions can be conducted as is well known in the art as illustrated by the above-mentioned U.S. Patent 3,056,817, especially in columns 3 and 4, where the term "alcoholysis or transesterification" is used.

Preferably the carrier compounds for the catalyst slurries of this invention contain from 1 to 10 carbon atoms and, besides butanol, can be illustrated by ethanol; hexanol; decanol; ethylene glycol; tetramethylene glycol; decamethylene glycol; 1,4-cyclohexanedimethanol; glycerol; and various isomers and homologs of these illustrative compounds. Especially preferred carrier compounds are the saturated monohydric and dihydric alcohols. Such compounds are most advantageous when they function in the preparative process to facilitate the elimination of water, avoid subsequent absorption of water, and do not deleteriously affect any ester exchange reaction into which they are ultimately introduced.

Butanol has been found to be especially advantageous with respect to the preparation of a catalyst slurry for use in preparing polyesters. This catalyst composition is preferably an anhydrous slurry of freshly precipitated amorphous titanium dioxide hydrate dispersed in butanol, said slurry having from about 2 to about 20 percent titanium calculated as metal, said hydrate containing from about 3 to about 5 percent water of hydration. In such a composition, the carrier is anhydrous, but the titanium dioxide contains water of hydration.

The amount of partially hydrated titanium dioxide which is present in the catalytic composition is not critical in the process of this invention.

In the above-described preferred method of preparing the slurry, the freshly precipitated titanium hydroxide (hydrated titanium dioxide) was washed with distilled water until free from ammonium and halogen ions or salts, then with methanol. The methanol wash may be considered the first step of the dehydration. The methanol-washed titanium hydroxide was dispersed in butanol and the methanol removed by distillation. The methanol was removed at this time to eliminate difficulty during the subsequent benzene treatment. Benzene was then added to the butanol-titanium hydroxide system, and the mixture further dehydrated, water being removed as the benzene azetrope (benzene-water azetrope, B.P. 69.25° C.). When the mixture was dry, as evidenced by the absence of water in the benzene distillate, the excess benzene was removed by distillation (benzene, B.P. 80.09° C.). The resulting dispersion of titanium hydroxide in butanol was filtered through a 150-mesh (Tyler) screen to remove large particles, diluted to the desired concentration with additional butanol, and used as such.

As may be noted in J. W. Mellor's "A Comprehensive Treatise on Inorganic and Theoretical Chemistry," titanium hydroxide (orthotitanic acid) dried at room temperature is reported to contain 29.83–31.11 percent water which corresponds to $TiO_2 \cdot 2H_2O$. When dried at 60–70° C., orthotitanic acid corresponds to $4TiO_2 \cdot 3H_2O$ (calcd. 14.25 percent water) and at 100° C., corresponds to $2TiO_2 \cdot H_2O$ (calcd. 10.12 percent water). In view of these dehydration data, the catalyst employed in the present invention can be characterized as a dispersion of colloidal titanium hydroxide in butanol wherein the titanium hydroxide contains less than 14 percent water of hydration. Mellor's book was published by Longman & Co., 1930, vol. VII, pp. 39–41.

EXAMPLE 2.—PREPARATION OF POLY(ETHYLENE TEREPHTHALATE)

Fifty-eight and two-tenths grams of dimethyl terephthalate (0.3 mole), 37.2 grams of ethylene glycol (0.6 mole), and 0.1 ml. of a fresh slurry prepared as in Example 1 were placed in a flask and heated under nitrogen with stirring at 185 to 190° C. Methanol evolved rapidly, and the alcoholysis was complete in approximately thirty minutes.

The temperature of the colorless residue was raised to 280 to 285° C. over a period of forty to fifty minutes. The reaction mixture (intermediate polymer) was placed under reduced pressure (about 1 mm. of mercury) and the temperature held at 280 to 285° C. for approximately thirty minutes. The melt viscosity increased rapidly, and at the end of the thirty minutes, the vacuum was released with nitrogen.

The inherent viscosity of the colorless polymer was found to be 0.67. It had a Gardner color value of about one.

EXAMPLE 3.—PREPARATION OF POLY(1,4-CYCLOHEXYLENEDIMETHYLENE TEREPHTHALATE

Thirty-eight and eight-tenths grams dimethyl terephthalate (0.2 mole), 40.3 grams 1,4-cyclohexanedimethanol (0.28 mole), and 0.1 ml. of a fresh slurry prepared as in Example 1 were placed in a flask and heated under nitrogen with stirring at 190 to 200° C. Methanol evolved rapidly, and the alcoholysis was complete in thirty to forty minutes.

The temperature was raised to 300° C. during a period of forty to fifty minutes. The reaction mixture was then placed under reduced pressure (about 1 mm. mercury), and the temperature held at 300° C. for one hour. The melt viscosity increased rapidly, and at the end of one hour, the vacuum was released with nitrogen.

The inherent viscosity was found to be 0.63, and the polymer remained colorless.

EXAMPLE 4

Three and eighty-eight one-hundredths grams dimethyl terephthalate (0.02 mole), 3.8 grams cyclohexane-1,4-dimethanol (0.0264 mole), 1.256 grams dibutyl sebacate (0.004 mole), and one drop of a fresh slurry prepared as in Example 1 were placed in a test tube and heated under nitrogen. The temperature was raised from 180° C. to 287° C. over a period of 90 minutes. Methanol and butanol evolved, and the alcoholysis was complete at the end of this time.

The reaction mixture was then placed under reduced pressure (about 1 mm. of mercury) and the temperature held at 290° C. for approximately ten minutes. The vacuum was released with nitrogen.

After cooling to room temperature, the resulting prepolymer was colorless, and the inherent viscosity was found to be 0.23. The intermediate polymer (can also be referred to as prepolymer) was ground to pass 60-mesh (Tyler) screen. The prepolymer was heated at 220° C. under reduced pressure (about 0.1 mm. of mercury) for three hours to build-up the molecular weight.

The resulting polymer was colorless, and the inherent viscosity was found to be 1.00.

EXAMPLE 5

The procedure described in Example 4 was repeated except that the dibutyl sebacate was replaced with 0.816 gram isosebacic acid (0.004 mole). The resulting polyester was found to have an inherent viscosity of 0.82.

EXAMPLE 6

The procedure described in Example 4 was repeated except that the dibutyl sebacate was replaced with 0.004 mole of dimethyl isophthalate. A colorless built-up polymer was obtained.

EXAMPLE 7

The procedure described in Example 4 was repeated except that the dibutyl sebacate was replaced with 0.67 gram succinic anhydride (0.0067 mole). The resulting polymer was colorless and had an inherent viscosity of 1.31.

EXAMPLE 8

Six and twenty-seven one-hundredths grams of the dibutyl ester of p,p′-sulfonyldibenzoic acid (0.015 mole), 0.3 gram succinic anhydride (0.003 mole), 3.1 grams 1,5-pentanediol (0.029 mole), and one drop of a fresh slurry prepared as in Example 1 were placed in a test tube and heated under nitrogen. The temperature was raised from 160° C. to 260° C. over a period of two hours. Butanol evolved, and the alcoholysis was complete at the end of this time.

The reaction mixture was placed under reduced pressure (about 1 mm. mercury) and the temperature held at 260° C. for approximately ten minutes. The vacuum was released with nitrogen.

After cooling to room temperature, the resulting prepolymer was colorless, and the inherent viscosity was found to be 0.19. The prepolymer was ground to pass 60-mesh (Tyler) screen. The prepolymer was heated at 203° C. under reduced pressure (about 0.1 mm. of mercury) for two hours.

The resulting polymer was colorless, and the inherent viscosity was found to be 1.32.

EXAMPLE 9

A vessel equipped with a stirrer, distilling head, and nitrogen inlet was charged with 9.7 grams (0.05 mole) of dimethyl terephthalate, 11.5 grams (0.08 mole) of cyclohexane-1,4-dimethanol (70 percent trans), 22.5 grams (0.008 mole) of poly(tetramethylene glycol) having a molecular weight of 2,800, and one drop of a fresh slurry as prepared in Example 1. The reaction vessel was swept with nitrogen, stirred, and heated to 200° C. When about 65 percent of the theoretical amount of methanol had been evolved, the temperature of the reaction mass was raised over a period of 30 minutes to 280° C. A vacuum was then applied so that the pressure was rapidly reduced to 0.3 mm. of mercury over a period of less than ten minutes. The molten mass was sttirred at less than 0.3 mm. of mercury at 275° C. to 280° C. for 60 minutes. At the end of the polyesterification, the polymer was cooled under vacuum and removed from the flask. It was a hard rubbery mass with an inherent viscosity of 1.15 and contained about 65 percent by weight of poly(tetramethylene glycol). This colorless polymer was extruded to form a highly flexible, elastic, and colorless film.

The invention has been described in detail with particular reference to preferred embodiments thereof, but it will be understood that variations and modifications can be effected within the spirit and scope of the invention as described hereinabove and as defined in the appended claims.

We claim:

1. A catalytic composition for promoting ester exchange between a relatively high boiling alcohol and an ester of a relatively low boiling alcohol and an organic carboxylic acid, said catalytic composition consisting of slurry consisting of substantially amorphous, partially hydrated titanium dioxides having from 2 to 14 percent by weight of water of hydration and dispersed in a liquid carrier compound which is a saturated alcohol having 1 to 3 hydroxyl groups.

2. A catalytic composition as defined by claim 1 wherein said liquid carrier compound contains from 1 to 10 carbon atoms.

3. A catalytic composition as defined by claim 1 wherein said liquid carrier compound is butanol, and said titanium dioxide has from about 3 percent to about 5 percent water of hydration.

4. A catalytic composition as defined by claim 1 wherein said liquid carrier compound is ethylene glycol.

5. A catalytic composition as defined by claim 1 wherein said liquid carrier compound is 1,4-cyclohexanedimethanol.

References Cited

UNITED STATES PATENTS

| | | |
|---|---|---|
| 2,749,248 | 6/1956 | Benson. |
| 2,843,556 | 7/1958 | Moorman _____ 260—863 XR |
| 2,901,466 | 8/1959 | Kibler et al. _____ 260—75 |
| 2,906,737 | 9/1959 | York _____ 260—75 |
| 3,056,817 | 10/1962 | Werber et al. _____ 260—75 XR |

WILLIAM H. SHORT, Primary Examiner

L. P. QUAST, Assistant Examiner

U.S. Cl. X.R.

23—202; 260—75, 470, 475, 485